(12) United States Patent
Violier et al.

(10) Patent No.: US 11,451,498 B2
(45) Date of Patent: Sep. 20, 2022

(54) OMNICHANNEL COMMUNICATION WIDGET

(71) Applicant: MessageBird BidCo B.V., Amsterdam (NL)

(72) Inventors: Bob Carly Violier, Amsterdam (NL); Joey Charles Van Ommen, Amsterdam (NL); Richard David Cochrane Dodds, Singapore (SG); Robert Daniel Vis, Amsterdam (NL)

(73) Assignee: MessageBird BidCo B.V., Amsterdam (NL)

( * ) Notice: Subject to any disclaimer, the term of this patent is extended or adjusted under 35 U.S.C. 154(b) by 0 days.

(21) Appl. No.: 16/886,188

(22) Filed: May 28, 2020

(65) Prior Publication Data

US 2021/0377193 A1 Dec. 2, 2021

(51) Int. Cl.
*G06F 15/16* (2006.01)
*H04L 51/046* (2022.01)
*H04L 9/40* (2022.01)
*H04L 51/56* (2022.01)

(52) U.S. Cl.
CPC ............ *H04L 51/046* (2013.01); *H04L 51/56* (2022.05); *H04L 63/08* (2013.01)

(58) Field of Classification Search
CPC ........ H04L 51/046; H04L 51/36; H04L 63/08
USPC ................ 709/206, 203, 205; 707/756, 760; 455/412.1; 715/758, 760, 751, 718, 717
See application file for complete search history.

(56) References Cited

U.S. PATENT DOCUMENTS

| 8,819,145 | B1* | 8/2014 | Gailloux | H04L 51/066 709/206 |
| 10,686,781 | B1* | 6/2020 | Kaditz | H04W 12/06 |
| 2005/0193345 | A1* | 9/2005 | Klassen | H04L 51/24 715/751 |
| 2006/0095514 | A1 | 5/2006 | Wang et al. | |
| 2008/0147406 | A1* | 6/2008 | Da Palma | G10L 15/22 704/260 |

(Continued)

FOREIGN PATENT DOCUMENTS

| EP | 2410704 A1 | 1/2012 |
| EP | 3402137 A1 | 11/2018 |

OTHER PUBLICATIONS

European Search Report in European Patent Application No. 20177132.6, dated Nov. 11, 2020.

*Primary Examiner* — Thuong Nguyen
(74) *Attorney, Agent, or Firm* — Baker Botts L.L.P.

(57) ABSTRACT

A system is configured to receive a request from a client device to provide web content for a frame in a web document provided by a web server and transmit the requested web content to the client device. The requested web content comprises an application for providing a live chat function. The system is further configured to exchange a first plurality of messages between the client device and another system via the application, exchange a second plurality of messages between a further client device and the other system via a further communication channel, and display a uniform view of the messages on the client device via the application upon determining that the identifiers associated with the messages correspond to a single user. The messages in the uniform view are ordered in chronological order based on the dates and times of receipt or transmission of the messages.

20 Claims, 9 Drawing Sheets

(56) References Cited

U.S. PATENT DOCUMENTS

| | | | |
|---|---|---|---|
| 2008/0244014 A1* | 10/2008 | Britton | H04L 51/36 |
| | | | 709/206 |
| 2010/0250592 A1 | 9/2010 | Paquet et al. | |
| 2012/0072507 A1 | 3/2012 | Chen et al. | |
| 2012/0185784 A1* | 7/2012 | Katz | G06F 16/954 |
| | | | 715/760 |
| 2013/0179491 A1* | 7/2013 | Bennett | H04L 12/1822 |
| | | | 709/203 |
| 2014/0013249 A1* | 1/2014 | Moeinifar | H04L 12/1813 |
| | | | 715/758 |
| 2014/0115466 A1 | 4/2014 | Barak et al. | |
| 2015/0007131 A1* | 1/2015 | Ortiz | G06F 8/38 |
| | | | 717/109 |
| 2015/0120777 A1* | 4/2015 | Ramos | G06F 16/248 |
| | | | 707/776 |
| 2015/0312207 A1 | 10/2015 | Paquet et al. | |
| 2016/0105475 A1* | 4/2016 | Goodman | G06F 3/04845 |
| | | | 715/753 |
| 2017/0353425 A1 | 12/2017 | Paquet et al. | |
| 2018/0063070 A1* | 3/2018 | Zucker | H04L 51/046 |
| 2018/0089742 A1* | 3/2018 | Narasimhan | H04L 67/22 |
| 2018/0331980 A1 | 11/2018 | Jernström | |
| 2019/0349213 A1* | 11/2019 | Shive | G06N 5/022 |
| 2020/0027139 A1* | 1/2020 | Nasreddine | H04L 63/08 |
| 2020/0045006 A1* | 2/2020 | Yi | H04L 51/22 |
| 2020/0265413 A1* | 8/2020 | Melzer | H04L 67/02 |
| 2020/0314211 A1* | 10/2020 | Oye | H04L 67/327 |
| 2020/0374251 A1* | 11/2020 | Warshaw | H04L 51/36 |

\* cited by examiner

OMNICHANNEL COMMUNICATION WIDGET

FIELD OF THE INVENTION

The invention relates to a system and a client device, e.g. a mobile phone, computer, or tablet, for providing a live chat function.

The invention further relates to methods of providing a live chat function.

The invention also relates to a computer program product enabling a computer system to perform such a method.

BACKGROUND OF THE INVENTION

The discussion below is merely provided for general background information and is not intended to be used as an aid in determining the scope of the claimed subject matter.

In order to improve communication with customers, brands like Mercedes and Canyon Bikes include the option to start an interactive chat with a live help agent (also referred to as live chat) on their website. Although live chat is a convenient way to start a chat with a brand, some people find other communication platforms/channels like WhatsApp, Facebook Messenger, SMS or e-mail more convenient for longer chats. It is therefore beneficial to allow a user to indicate in the live chat that they want to continue the live chat via another communication platform/channel.

However, continuing a live chat via another communication platform/channel results in communication with a brand being scattered over multiple communication platforms/channels and possibly multiple devices, which may make customers hesitant to start a live chat.

SUMMARY OF THE INVENTION

This Summary and the Abstract herein are provided to introduce a selection of concepts in a simplified form that are further described below in the Detailed Description. This Sum-mary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

In a first aspect of the invention, a system for providing a live chat function comprises at least one input interface, at least one output interface, and at least one processor configured to receive, via said at least one input interface, a request from a client device to provide web content for a frame in a web document, said web document being provided to said client device by a further system, transmit, via said at least one output interface, said requested web content to said client device, said requested web content comprising an application for providing said live chat function, said application communicating with said system when said application is executed by said client device, exchange a first plurality of messages between said client device and said further system or another system via said application, said first plurality of messages being associated with a first user identifier, and determine a first plurality of dates and times of receipt or transmission of said first plurality of messages.

Said at least one processor is further configured to exchange a second plurality of messages between said client device or a further client device and said further system or said another system via a further communication channel, said second plurality of messages being associated with a second user identifier, determine a second plurality of dates and times of receipt or transmission of said second plurality of messages, determine whether said first user identifier and said second user identifier correspond to a single user, and display a uniform view of said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission.

This system allows brands, and other companies and organizations, to provide a uniform view of messages exchanged using different communication platforms/channels in a live chat application provided on their websites. By using a live chat application of a communication integrator that executes in a frame of a web document, i.e. web page, and communicates with a communication integrator server, it becomes possible to provide live agents with a tool that gives them access to messages exchanged using different communication platforms/channels, including live chat.

An example of such a tool is Inbox from MessageBird of Amsterdam, The Netherlands. This is an omnichannel software application that provides live agents access to a collection of channels and provides collaboration functionalities to improve the live agent's user experience and drive better relationships cross-channel/cross-functionality. When providing such a tool, it is also possible to enable users to get quick access to messages exchanged using different communication platforms/channels.

By providing a uniform view of the messages exchanged using different communication platforms/channels in the live chat application, the users can get quick access to these messages. The uniform view in which the messages are displayed together ordered in chronological order is beneficial for live chat applications, because the frame in the web document is normally limited in size.

Said at least one processor may be configured to display, in said uniform view, at least one of said dates and times of receipt or transmission for at least one of said messages in said uniform view.

Said at least one processor may be configured to display, in said uniform view, an indication of a communication channel over which said messages in said uniform view were received for each of said messages.

Said at least one processor may be configured to receive, via said application, from said client device, a request to switch to said further communication channel Examples of communication channels other than live chat on a website are e-mail, Facebook Messenger, WhatsApp server, Signal, WeChat server, Line, Telegram, and SMS.

Said at least one processor may be configured to receive said second user identifier from said client device via said application and determine whether said second user identifier has been authenticated for any company or organization. For example, the user may provide his phone number or e-mail address in the live chat application. In order not to share messages exchanged over other communication channels with other users, the user needs to authenticate the identity of the user on the communication platforms/channels.

Said at least one processor may be configured to obtain said second user identifier from storage means, said second user identifier being associated with said first user identifier. A phone number or e-mail address may be obtained from a server of a brand, for example.

Said at least one processor may be configured to determine whether said second user identifier has been authenticated for any company or organization. If live chat applications would each communicate directly with web servers of brands, the user would need to authenticate his identity each time he wants to switch to another communication channel in a live chat with a new brand. Since the live chat application is obtained from the communication integrator and communicates with the communication integrator server in the above-described system, it becomes possible to avoid, without privacy concerns, that the user needs to authenticate his identity for each brand separately.

Said at least one processor may be configured to, upon determining that said second user identifier has not been authenticated for any company or organization, attempt to authenticate said second user identifier over said further communication channel or with a communication platform/channel server corresponding to said further communication channel, and store said second user identifier as an authenticated user identifier associated with said first user identifier upon performing said authentication successfully. The first user identifier is typically also stored on the client device as a cookie. By storing an (encoded) user identifier as a cookie on the client device, the communication integrator has access to this user identifier and can determine on which communication platforms/channels identities associated with this user identifier have been authenticated. This user identifier can be encoded such that it cannot be stolen or spoofed.

In a second aspect of the invention, a client device for providing a live chat function comprises at least one input interface, at least one output interface, and at least one processor configured to receive, via said at least one input interface, a web document from a web server, said web document comprising a frame, transmit, via said at least one output interface, a request to provide web content for said frame to a communication integrator system, receive, via said at least one input interface, said requested web content from said communication integrator system, said requested web content comprising an application for providing said live chat function, said application communicating with said communication integrator system when said application is executed by said client device, and exchange a first plurality of messages between said client device and said web server or another system via said application, said first plurality of messages being associated with a first user identifier.

Said at least one processor is further configured to receive, via said application, from said communication integrator system, a uniform view of said first plurality of messages and a second plurality of messages, said second plurality of messages being exchanged between said client device or a further client device and said web server or said another system via a further communication channel, said second plurality of messages being associated with a second user identifier, said first user identifier and said second user identifier corresponding to a single user, and said messages in said uniform view being ordered in chronological order based on dates and times of receipt or transmission of said first and second pluralities of messages, and display said uniform view on a display.

Said at least one processor may be configured to display, in said uniform view, at least one of said dates and times of receipt or transmission for at least one of said messages in said uniform view.

Said at least one processor may be configured to display, in said uniform view, an indication of a communication channel over which said messages in said uniform view were received for each of said messages.

Said at least one processor may be configured to receive, via said application, from said client device, a request to switch to said further communication channel.

In a third aspect of the invention, a method of providing a live chat function by a communication integrator system comprises receiving a request from a client device to provide web content for a frame in a web document, said web document being provided to said client device by a further system, transmitting said requested web content to said client device, said requested web content comprising an application for providing said live chat function, said application communicating with said communication integrator system when said application is executed by said client device, exchanging a first plurality of messages between said client device and said further system or another system via said application, said first plurality of messages being associated with a first user identifier, and determining a first plurality of dates and times of receipt or transmission of said first plurality of messages.

Said method further comprises exchanging a second plurality of messages between said client device or a further client device and said further system or said another system via a further communication channel, said second plurality of messages being associated with a second user identifier, determining a second plurality of dates and times of receipt or transmission of said second plurality of messages, determining whether said first user identifier and said second user identifier correspond to a single user, and displaying a uniform view of said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission. Said method may be performed by software running on a programmable device. This software may be provided as a computer program product.

In a fourth aspect of the invention, a method of providing a live chat function at a client device comprises receiving a web document from a web server, said web document comprising a frame, transmitting a request to provide web content for said frame to a communication integrator system, receiving said requested web content from said communication integrator system, said requested web content comprising an application for providing said live chat function, said application communicating with said communication integrator system when said application is executed by said client device, and exchanging a first plurality of messages between said client device and said web server or another system via said application, said first plurality of messages being associated with a first user identifier.

Said method further comprises receiving, via said application, from said communication integrator system, a uniform view of said first plurality of messages and a second plurality of messages, said second plurality of messages being exchanged between said client device or a further client device and said web server or said another system via a further communication channel, said second plurality of messages being associated with a second user identifier, said first user identifier and said second user identifier corresponding to a single user, and said messages in said uniform view being ordered in chronological order based on dates and times of receipt or transmission of said first and second pluralities of messages, and displaying said uniform view on a display. Said method may be performed by software running on a programmable device. This software may be provided as a computer program product.

A non-transitory computer-readable storage medium stores at least a first software code portion, the first software code portion, when executed or processed by a computer, being configured to perform executable operations for providing a live chat function by a communication integrator system.

The executable operations comprise receiving a request from a client device to provide web content for a frame in a web document, said web document being provided to said client device by a further system, transmitting said requested web content to said client device, said requested web content comprising an application for providing said live chat function, said application communicating with said communication integrator system when said application is executed by said client device, exchanging a first plurality of messages between said client device and said further system or another system via said application, said first plurality of messages being associated with a first user identifier, and determining a first plurality of dates and times of receipt or transmission of said first plurality of messages.

The executable operations further comprise exchanging a second plurality of messages between said client device or a further client device and said further system or said another system via a further communication channel, said second plurality of messages being associated with a second user identifier, determining a second plurality of dates and times of receipt or transmission of said second plurality of messages, determining whether said first user identifier and said second user identifier correspond to a single user, and displaying a uniform view of said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission.

A non-transitory computer-readable storage medium stores at least a second software code portion, the second software code portion, when executed or processed by a computer, being configured to perform executable operations for providing a live chat function at a client device.

The executable operations comprise receiving a web document from a web server, said web document comprising a frame, transmitting a request to provide web content for said frame to a communication integrator system, receiving said requested web content from said communication integrator system, said requested web content comprising an application for providing said live chat function, said application communicating with said communication integrator system when said application is executed by said client device, and exchanging a first plurality of messages between said client device and said web server or another system via said application, said first plurality of messages being associated with a first user identifier.

The executable operations further comprise receiving, via said application, from said communication integrator system, a uniform view of said first plurality of messages and a second plurality of messages, said second plurality of messages being exchanged between said client device or a further client device and said web server or said another system via a further communication channel, said second plurality of messages being associated with a second user identifier, said first user identifier and said second user identifier corresponding to a single user, and said messages in said uniform view being ordered in chronological order based on dates and times of receipt or transmission of said first and second pluralities of messages, and displaying said uniform view on a display. Said method may be performed by software running on a programmable device. This software may be provided as a computer program product.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
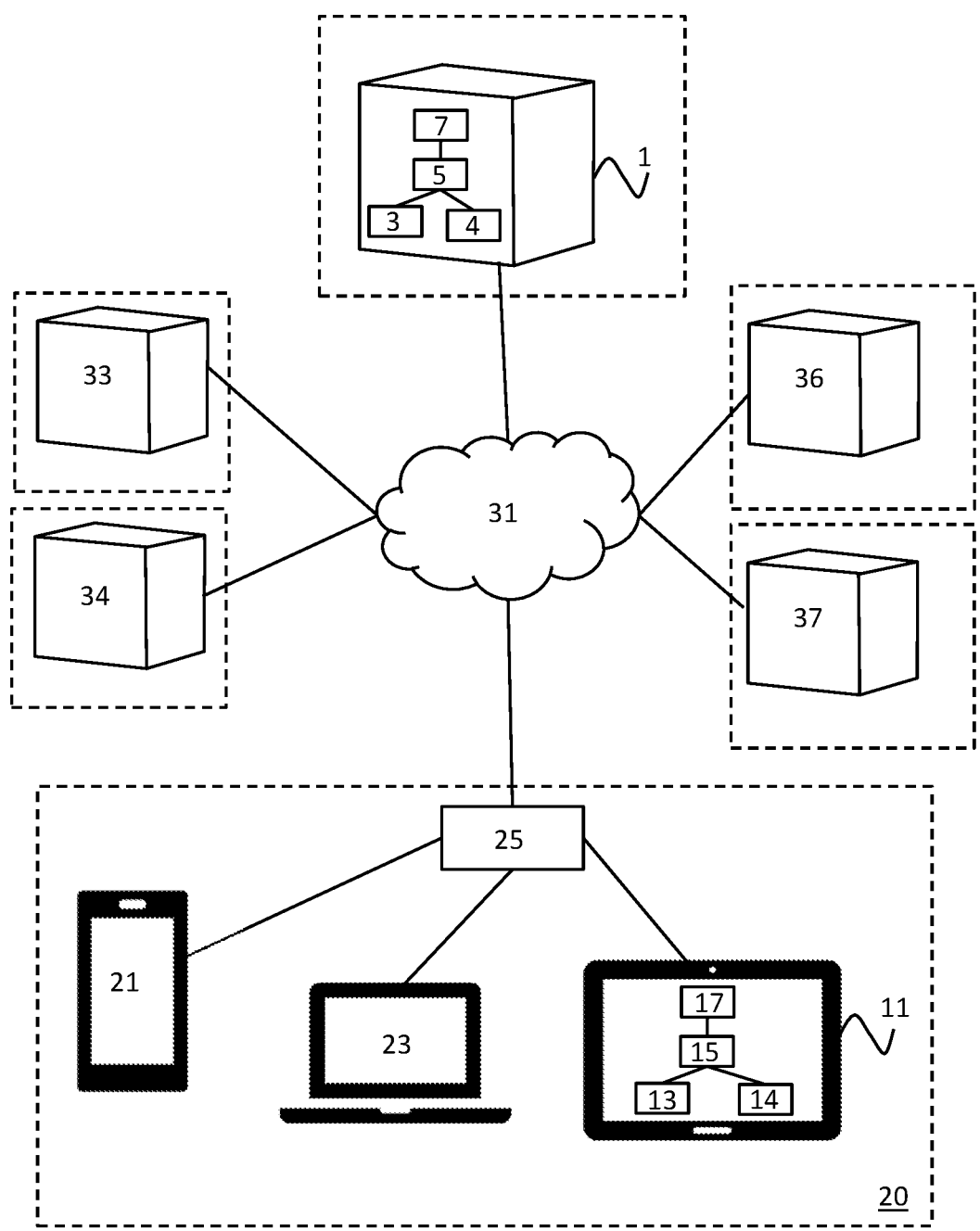
FIG. 1 is a block diagram of an embodiment of the system and client device.

FIG. 1 shows an embodiment of a system for providing an interactive chat function at a customer device: Internet server 1. Internet server 1 is used by a communication integrator like MessageBird. The Internet server 1 is not the main point of entry for users. Instead, users visit the websites of brands, e.g. web servers 33 and 34 of brands A and B, respectively. Brands A and B may be retailers, for example.

In the example of FIG. 1, a first user has a home network 20 comprising an Internet access point 25. The user uses a tablet 11, a mobile phone 21 and a laptop 23 to communicate with devices on the Internet via the Internet access point 25. The Internet access point 25, web servers 33 and 34, the Internet server 1 and communication platform/channel servers 36 and 37 are all connected to the Internet (backbone) 31.

The communication platform/channel servers 36 and 37 may comprise one or more of a mail server, a Facebook Messenger server, a WhatsApp server, a Signal server, a WeChat server, a Line server, a Telegram server, a Viber server, and an SMS gateway, for example. The communication platform/channel servers 36 and 37 are used to transmit and receive messages with text, voice and/or video content.

The communication platform/channel servers 36 and 37 are used to transfer messages between users of the platform, e.g. between mobile phone 21 and Internet server 1. A different communication platform/channel corresponds to a different communication channel. The communication channels may include SMS, WhatsApp, WeChat, Signal, Facebook Messenger, Telegram, Line and Viber, and email, for example. For instance, the communication platform/channel server 36 may be a WhatsApp server and the message sent via this platform/channel a WhatsApp message. The communication platform/channel servers 36 and 37 may also be used to authenticate the identity of a user, e.g. using OAuth.

The Internet server 1 comprises a receiver 3, a transmitter 4, a processor 5, and memory 7. The processor 5 is configured to receive, via the receiver 3, a request from tablet 11 to provide web content for a frame in a web document. The web document is provided to the tablet 11 by the web server 33 or 34. The processor 5 is further configured to transmit, via the transmitter 4, the requested web content to the tablet 11. The requested web content comprises an application for providing the live chat function. The application communicates with the Internet server 1 when the application is executed by the tablet 11.

The processor 5 is further configured to exchange a first plurality of messages between the tablet 11 and the web server 33 or 34 (or another system of brand A or B) via the application and determine a first plurality of dates and times of receipt or transmission of the first plurality of messages. The first plurality of messages is associated with a first user identifier.

The processor 5 is further configured to exchange a second plurality of messages between the tablet 11, the mobile phone 21 or the laptop 23 and the web server 33 or 34 (or another system of brand A or B) via a further communication channel and determine a second plurality of dates and times of receipt or transmission of the second plurality of messages. The second plurality of messages is associated with a second user identifier.

The processor 5 is further configured to determine whether the first user identifier and the second user identifier correspond to a single user and display a uniform view of the first plurality of messages and the second plurality of messages on the tablet 11 via the application upon determining that the first user identifier and the second user identifier correspond to a single user. The messages in the uniform view are ordered in chronological order based on the first and second pluralities of dates and times of receipt or transmission. The live chat application with the uniform view may also be accessible on the mobile phone 21 and the laptop 23 via a web browser.

The tablet 11 comprises a receiver 13, a transmitter 14, a processor 15, and memory 17. The processor 15 is configured to receive, via the receiver 13, a web document from web server 33 or 34. The web document comprises a frame. The processor 15 is further configured to transmit, via the transmitter 14, a request to provide web content for the frame to the Internet server 1, and receive, via the receiver 13, the requested web content from the Internet server 1. The requested web content comprises an application for providing the live chat function. The application communicates with the Internet server 1 when the application is executed by the tablet 11.

The processor 15 is further configured to exchange a first plurality of messages between the tablet 11 and the web server 33 or 34 (or another system of brand A or B) via the application. The first plurality of messages is associated with a first user identifier. The processor 15 is further configured to receive, via the application, from the Internet server 1, a uniform view of the first plurality of messages and a second plurality of messages. The second plurality of messages is exchanged between the tablet 11, the mobile phone 21 or the laptop 23 and the web server 33 or 34 (or another system of brand A or B) via a further communication channel.

The second plurality of messages is associated with a second user identifier. The first user identifier and the second user identifier correspond to a single user. The messages in the uniform view are ordered in chronological order based on dates and times of receipt or transmission of the first and second pluralities of messages. The processor 15 is further configured to display the uniform view on a display of the tablet 11.

In the embodiment of the Internet server 1 shown in FIG. 1, the Internet server 1 comprises one processor 5. In an alternative embodiment, the Internet server 1 comprises multiple processors. The processor 5 of the Internet server 1 may be a general-purpose processor, e.g. from Intel or AMD, or an application-specific processor. The processor 5 of the Internet server 1 may run a Windows or Unix-based operating system for example. The memory 7 may comprise one or more memory units. The memory 7 may comprise one or more hard disks and/or solid-state memory, for example. The memory 7 may be used to store an operating system, applications and application data, for example.

The receiver 3 and the transmitter 4 may use one or more wired and/or wireless communication technologies such as Ethernet or Wi-Fi (IEEE 802.11) to communicate with an Internet access point (not shown), for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The Internet server 1 may comprise other components typical for a computer such as a power connector. The invention may be implemented using a computer program running on one or more processors.

In the embodiment of the tablet 11 shown in FIG. 1, the tablet 11 comprises one processor 15. In an alternative embodiment, the tablet 11 comprises multiple processors. The processor 15 of the tablet 11 may be a general-purpose processor, e.g. from ARM or Qualcomm or an application-specific processor. The processor 15 of the tablet 11 may run an Android or iOS operating system for example. The tablet comprises a touchscreen display. The processor 15 uses this touch screen to provide a user interface. The display may comprise an LCD or OLED display panel, for example. The memory 17 may comprise one or more memory units. The memory 17 may comprise solid state memory, for example.

The receiver 13 and the transmitter 14 may use one or more wireless communication technologies, e.g. Wi-Fi (IEEE 802.11) for communicating with Internet access point 25, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 13 and the transmitter 14 are combined into a transceiver. The tablet 11 may comprise other components typical for a mobile device such as a battery and a power connector. The invention may be implemented using a computer program running on one or more processors.

When the user visits the website of brand A with a web browser on his tablet 11, his web browser will receive an HTML page from the web server 33. This HTML page may comprise a frame with a live chat, may comprise a button (or other link) to start a live chat, or may link to another HTML page which comprises a frame with a live chat or a button (or other link) to start a live chat. When a user clicks a button to start a live chat, a frame with the live chat is obtained. The frame is typically an HTML iFrame.

Figure 2:
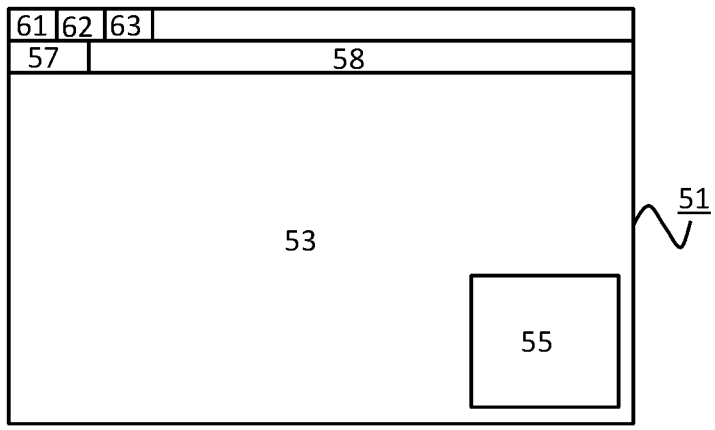
FIG. 2 depicts an example of web content which comprises a frame.

While the main HTML pages are obtained from the web server 33, the contents of the frame are obtained from the Internet server 1. The frame typically also comprises HTML code. An example of a main HTML page 53 that is displayed in a web browser 51 is shown in FIG. 2. The main HTML page 53 is shown in a first tab 61 of the web browser 51. The web browser 51 further shows tabs 62 and 63, a navigation bar 57 and an address bar 58.

Figure 3:
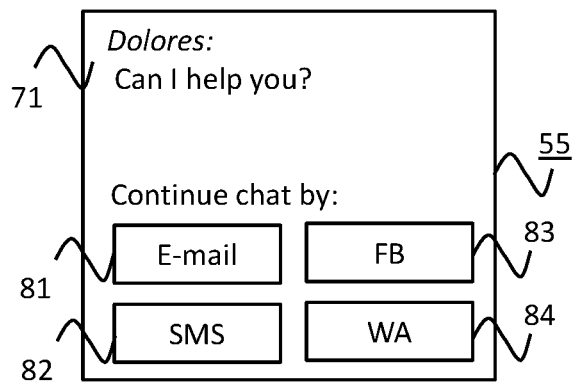
FIG. 3 depicts an example of a live chat which provides an option to switch to another communication channel.

A first example of the contents of frame 55 is shown in FIG. 3. A first message 71 comprises "Can I help you?". This message 71 may be an automatically sent message to invite customers to start chatting or may be sent by a live agent, e.g. called Dolores, after the user has started the live chat himself. The user is then given the option to continue the chat via another communication platform/channel. Four options 81-84 are presented in the frame 55: button 81 is associated with e-mail, button 82 is associated with SMS, button 83 is associated with Facebook Messenger and button 84 is associated with WhatsApp.

Figure 4:
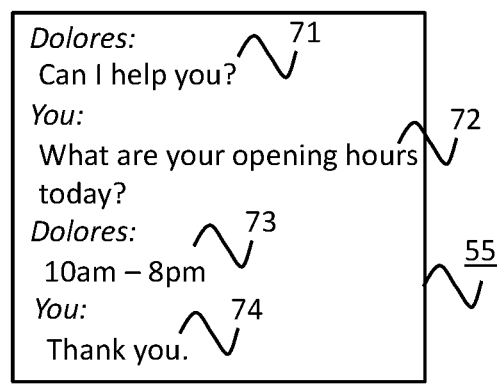
FIG. 4 depicts a first example of a live chat with a uniform view.

If the user decides to continue chat by WhatsApp, he will typically send and receive messages via a dedicated app. However, in order to allow the user to get a uniform overview of all the messages exchanged on all different communication channels, the messages exchanged via WhatsApp are also shown in the frame. The frame 55 of FIG. 4 is, for example, shown when the user continues chatting via WhatsApp, but does not close the website, or shown the next time the user visits the website. The frame 55 of FIG. 4 comprises three messages exchanged via WhatsApp: messages 72-74. Message 72 comprises the user saying "What are your opening hours today?". Message 73 comprises the live agent named (or going by the name) Dolores saying "10 am-8 pm". Message 74 comprises the user saying "Thank you".

Figure 5:
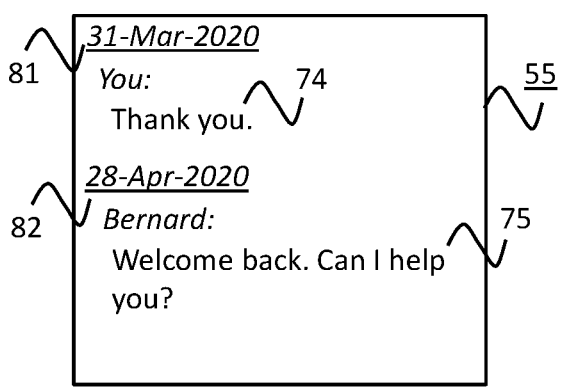
FIG. 5 depicts a second example of a live chat with a uniform view.

A third example of the contents of frame 55 is shown in FIG. 5. In this example, the user comes back at a later date and starts a new live chat. A live agent named (or going by the name) Bernard writes a message 75 saying "Welcome back. Can I help you?". In order to allow the user to get a uniform overview of all the messages exchanged on all different communication channels, the user can also see/browse through his old messages, including message 74 depicted in FIG. 4.

In the example of FIG. 5, only one conversation is possible and when the user comes back, he continues with his previous conversation. Alternatively, it may be possible to have multiple conversations, e.g. about different subjects. The user is then able to switch conversations. When the user comes back after a while, he may be asked whether he wants to continue his old conversation or start a new one. Additionally or alternatively, a user may be able to switch conversations at any time. When multiple conversations are supported, a uniform view is provided per conversation and messages in the same conversation but exchanged over different channels (e.g. WhatsApp, live chat, e-mail) are shown in the same view in chronological order.

The messages are ordered in chronological order based on the time stamps associated with the messages. A time stamp may be included in a message by the transmitter or may be associated with a message by the receiver. The displayed messages are the messages transmitted and received by the Internet server 1. If a message was sent by a user, but not received by the Internet server 1, it is not displayed in frame 55. The messages may have text, voice and/or video content. The messages may be sent over communication channels like live chat, SMS, WhatsApp, WeChat, Signal, Facebook Messenger, Telegram, Line and Viber, and email, for example.

In the third example, the first displayed message sent on a certain date is preceded by an indication of the date. Message 74 is preceded by a date indicator 81 indicating 31 Mar. 2020. Message 75 is preceded by a date indicator 82 indicating 28 Apr. 2020. Alternatively, (only) the first message sent on a certain date is preceded by a date indicator. If this would be applied to the example of FIG. 5, the user would need to scroll back through the messages to see date indicator 81, which would be displayed before message 71. Alternatively, the date indicator may be omitted.

Figure 6:
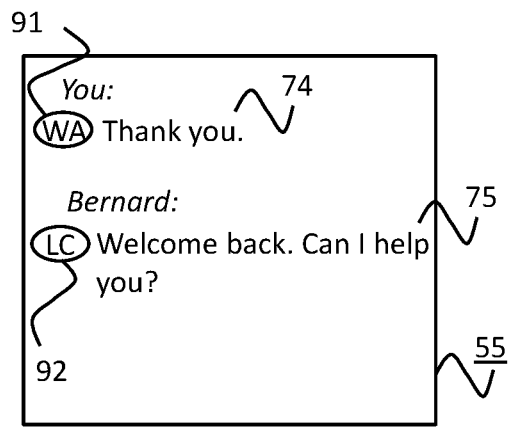
FIG. 6 depicts a third example of a live chat with a uniform view.

A fourth example of the contents of frame 55 is shown in FIG. 6. In this example, it is indicated in the frame via which communication channel/platform the message was sent. The message 74 was sent via WhatsApp, as indicated by icon 91. The message 75 was sent via live chat on the website, as indicated by icon 92.

Figure 7:
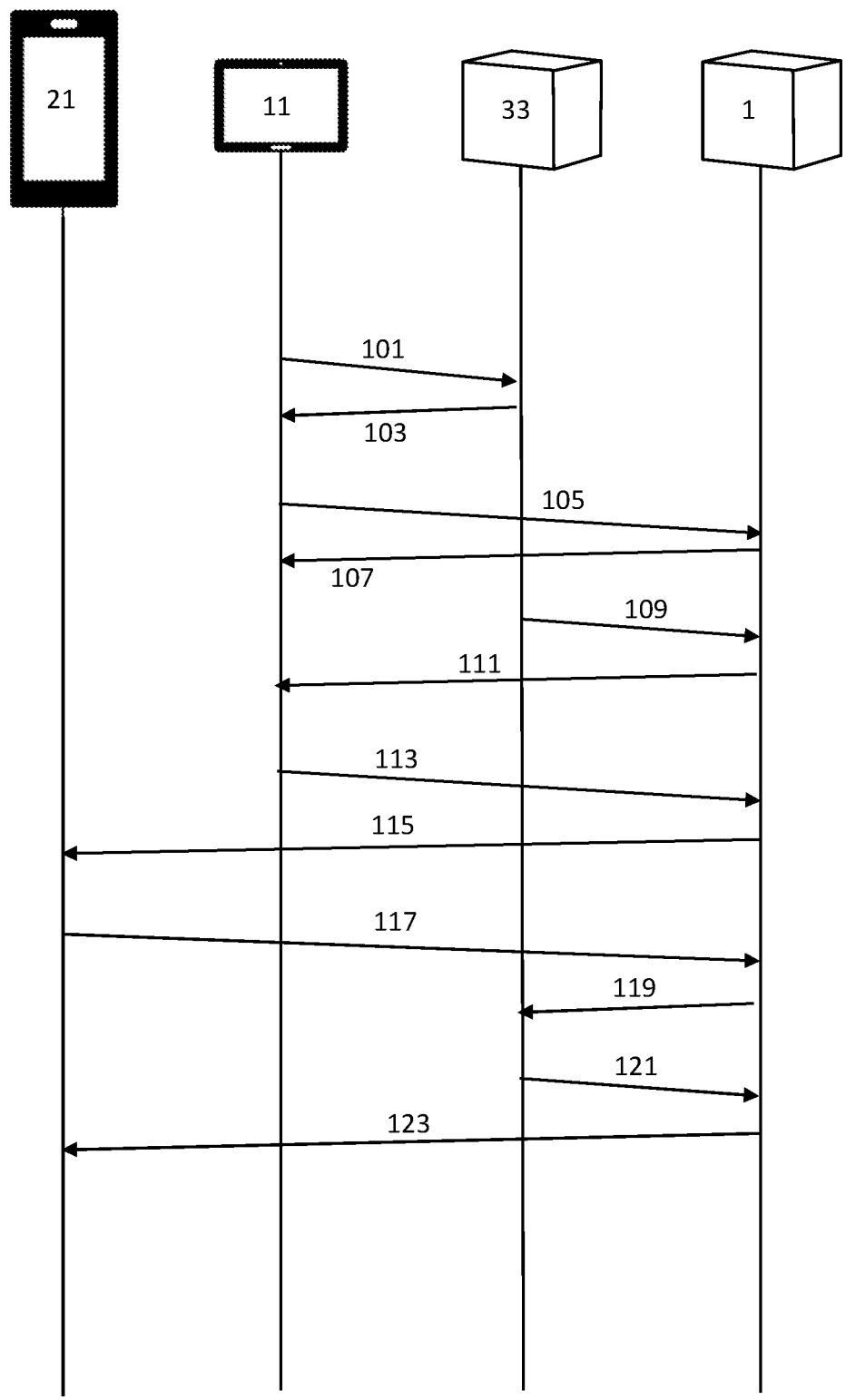
FIG. 7 shows a first example of a communication flow between different devices/systems of FIG. 1.

A first example of a communication flow between different devices/systems of FIG. 1 using multiple communication channels is shown in FIG. 7. In this first example, the user is returning to a brand/website that he has visited before. In step 101, the tablet 11 requests an HTML page with a live chat from web server 33. In response, the web server 33 then transmits HTML page 51 of FIG. 2 to the tablet 11 in step 103. After decoding HTML page 51, the browser identifies the frame 55 and in step 105, requests the contents of frame 55 from the URL associated with the frame, which is located on Internet server 1. In response, the Internet server 1 (of the communications integrator) sends the contents of the requested frame to the tablet 11 in step 107.

These frame contents include a widget. The widget may be customized based on the preferences of the user and/or brand. The user may be able to indicate a preferred communication channel, e.g. in a customer profile, or a preferred communication channel may be learned by analyzing the usage history of the user. The user preferences may be general, i.e. apply to all brands, or may be indicated or learned per brand.

In step 109, the live agent enters a message, e.g. message 71 of FIG. 4, in a web application running on web server 33, which sends it to the Internet server 1. In step 111, the Internet server 1 then sends the message to the tablet 11 to be displayed in the frame. The messages received and transmitted by the Internet server 1 are stored on the Internet server 1, associated with an identifier of the user and an identifier of the brand. Assuming that the frame 55 of FIG. 3 is sent in step 107, the user selects to continue the chat by WhatsApp, i.e. presses button 84 of FIG. 3. Since the Internet server 1 recognizes the user, has previously received a phone number from the user and has authenticated the validity of this phone number, the switch to WhatsApp is confirmed in step 115 via WhatsApp.

After the user receives the confirmation on his mobile phone 21 via WhatsApp, the user opens the WhatsApp app and sends a WhatsApp message in step 117, e.g. message 72 of FIG. 4. In step 119, this message is forwarded to the web application running on web server 33 and shown in a browser of a live agent that is accessing this web application. In step 121, the live agent enters a message, e.g. message 73 of FIG. 4, in the web application, which sends it to the Internet server 1. The Internet server 1 then sends the message to the mobile phone 21 of the user via WhatsApp.

Figure 8:
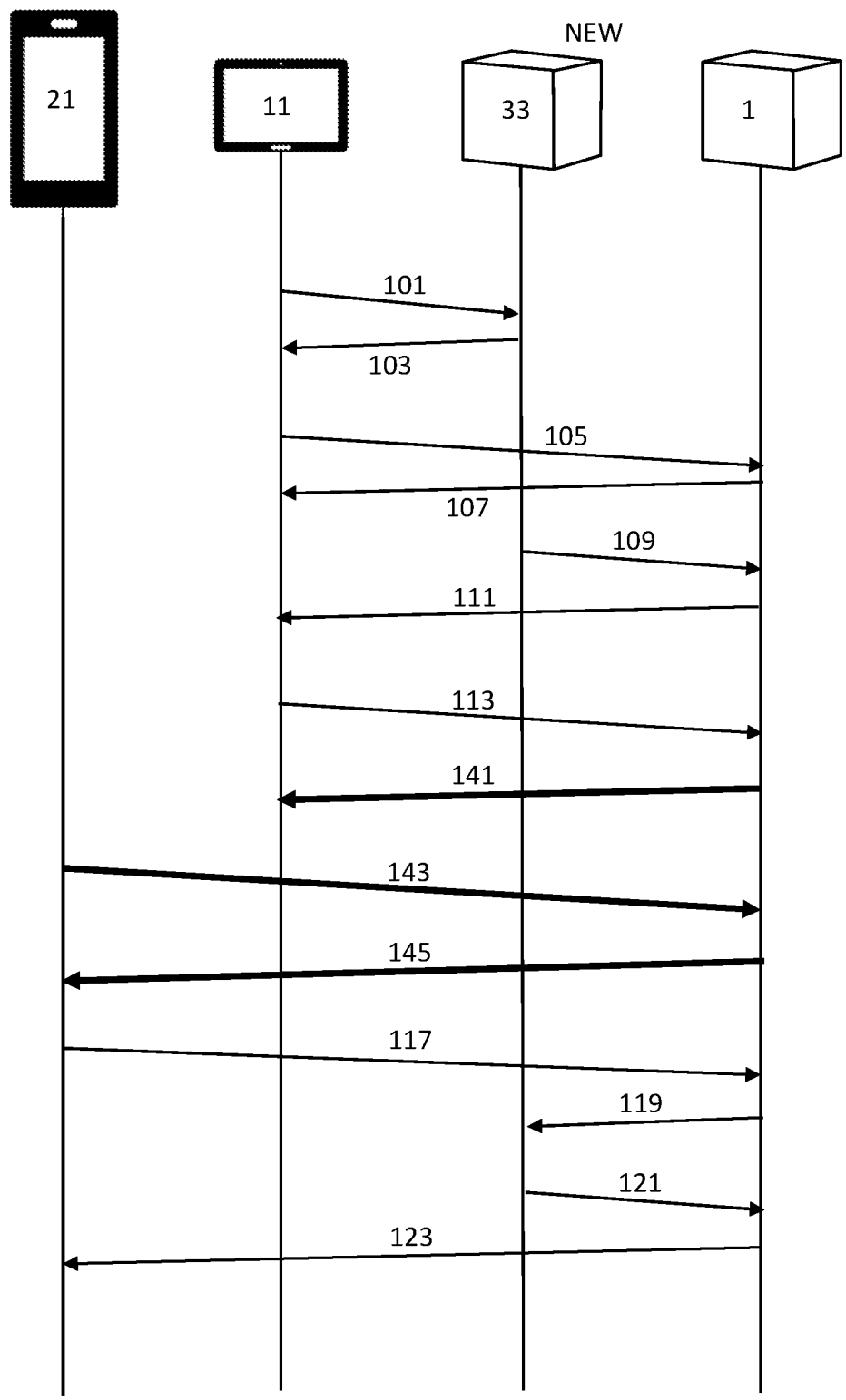
FIG. 8 shows a second example of a communication flow between different devices/systems of FIG. 1.

A second example of a communication flow between different devices/systems of FIG. 1 using multiple communication channels is shown in FIG. 8. In this second example, the user is visiting a brand/website that he has not visited before. Steps 101-113 of FIG. 8 are the same as in FIG. 7. However, in the example of FIG. 8, the user is not recognized and a QR code is therefore shown in the frame 55 on the tablet 11 by the Internet server 1 in step 141. The user then scans the QR code displayed on the tablet 11 with his mobile phone 21. This results in his mobile phone 21 opening the WhatsApp application, creating a pre-filled message to the communication integrator and transmitting this message to the Internet server 1 in step 143. Receipt of this message validates for the communications integrator that the user is the owner of the WhatsApp number (i.e. phone number). Thus, this completes the authentication of the identity of the user on this communication platform/channel.

After the authentication has been completed and the Internet server 1 knows the phone number of the mobile phone 21, the Internet server 1 stores the authenticated information with an identifier of the user and transmits a WhatsApp message confirming the successful authentication to the mobile phone 21 in step 145. Alternatively or additionally, a confirmation message may be displayed to the user on tablet 11 via the widget. Steps 117-123 of FIG. 8 are the same as in FIG. 7.

Figure 9:
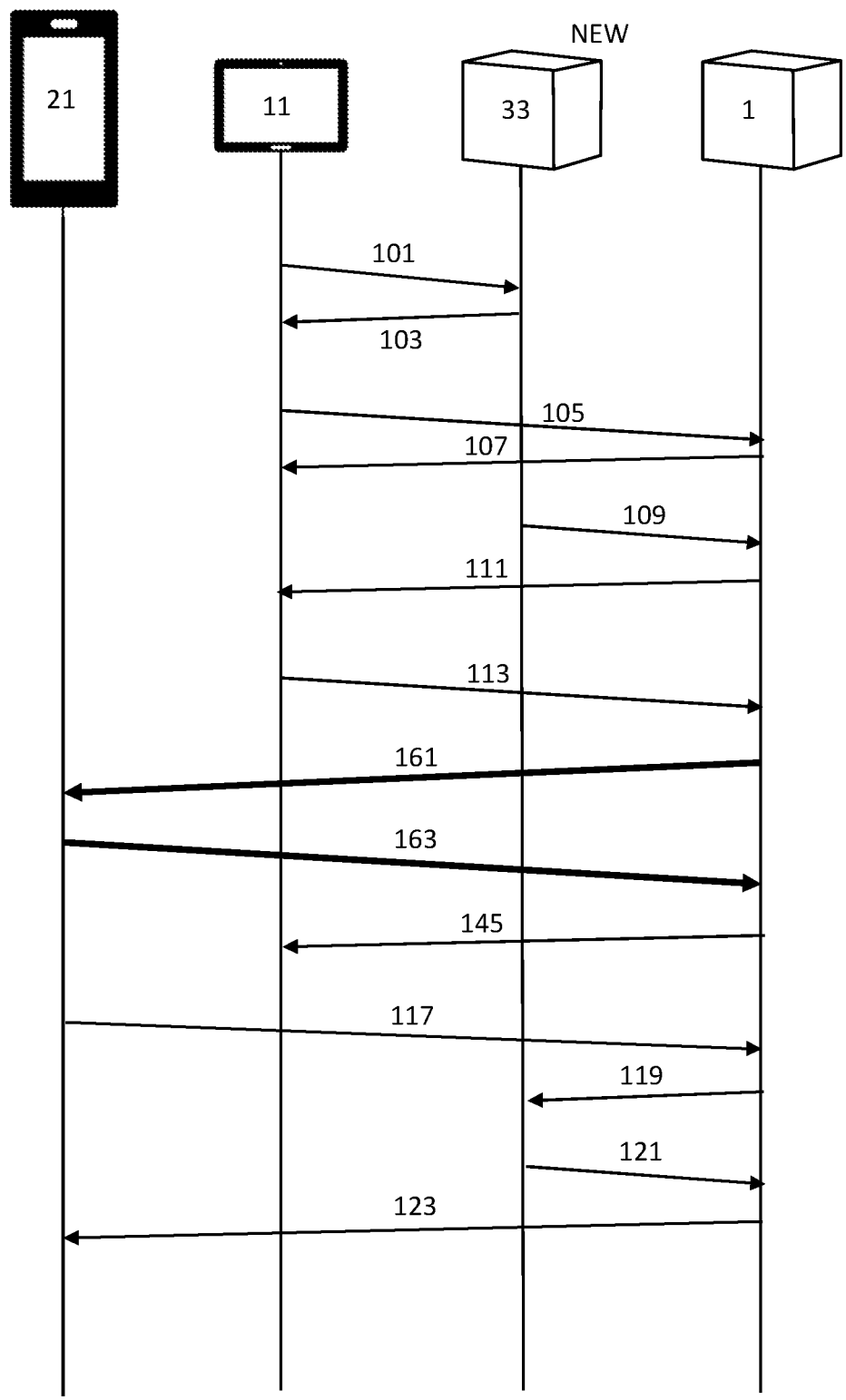
FIG. 9 shows a third example of a communication flow between different devices/systems of FIG. 1.

A third example of a communication flow between different devices/systems of FIG. 1 using multiple communication channels is shown in FIG. 9. In this third example, the user is visiting a brand/website that he has not visited before, like in the second example of FIG. 8. Steps 101-113 of FIG. 9 are the same as in FIG. 8. However, in the example of FIG. 9, a phone number of the user is sent to the Internet server 1, e.g. in step 113, and a WhatsApp message with an URL is sent by the Internet server 1 to the mobile device 21 (which comprises a SIM card with the above-mentioned phone number) when the user is not recognized. The user then visits the URL included in the WhatsApp message, upon which the authentication is completed successfully. Steps 145 and 117-123 of FIG. 9 are the same as in FIG. 8.

Figure 10:
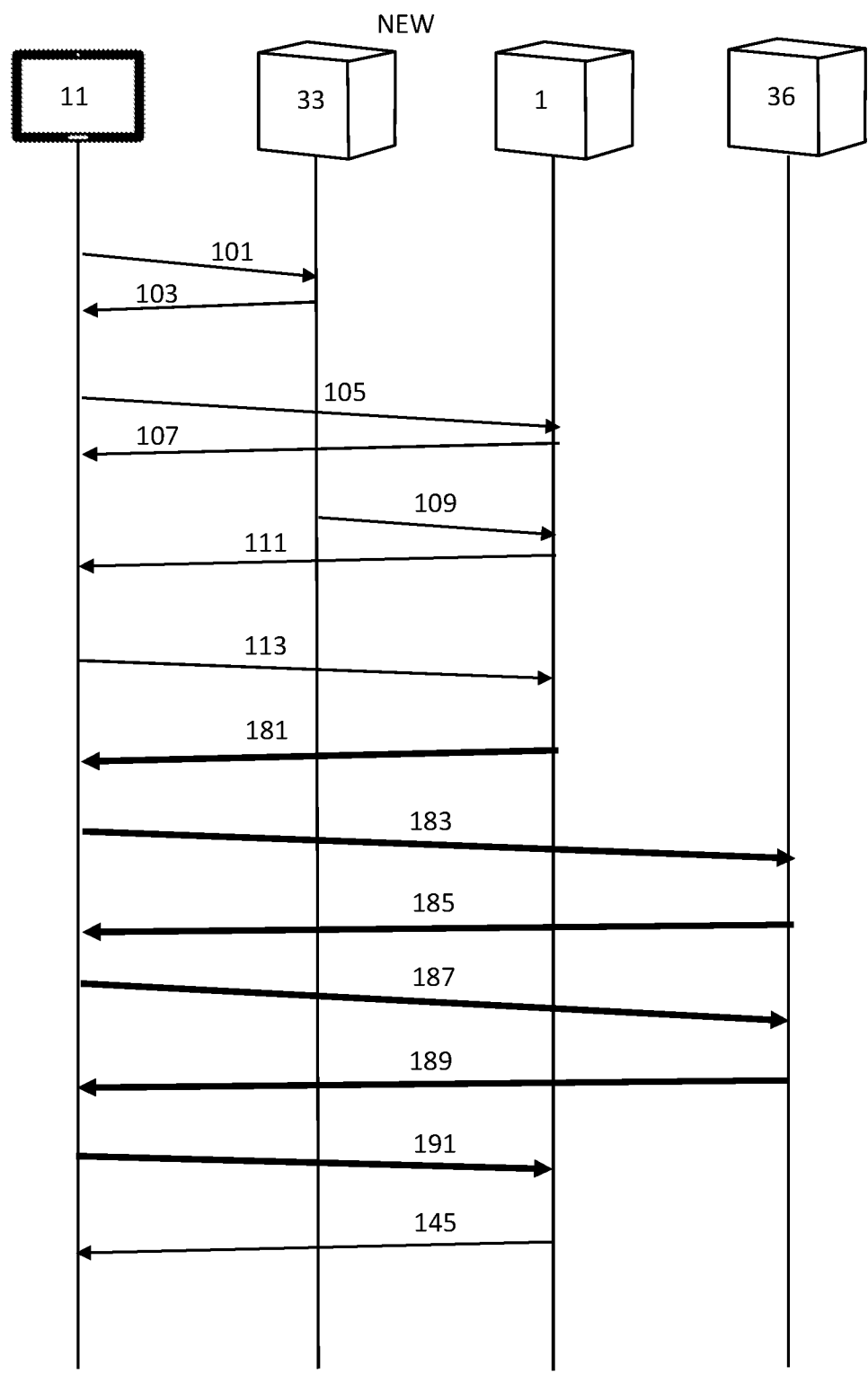
FIG. 10 shows a fourth example of a communication flow between different devices/systems of FIG. 1.

A fourth example of a communication flow between different devices/systems of FIG. 1 using multiple communication channels is shown in FIG. 10. In this fourth example, the user is visiting a brand/website that he has not visited before, like in the second and third examples of FIGS. 8 and 9. Steps 101-113 of FIG. 10 are the same as in FIGS. 8 and 9. However, in the example of FIG. 10, the user selects to continue the chat by Facebook Messenger, i.e. presses button 83 of FIG. 3. Facebook Messenger supports the OAuth protocol, so the OAuth protocol is used to authenticate the user on Facebook Messenger.

In step 181, the Internet server 1 formulates a request for the identity provider, i.e. Facebook Messenger, encodes it, and sends it as part of a redirect URL via frame 55 to the tablet 11 in step 181. The redirect URL redirects to the communication platform/channel server 36. In step 183, the browser of tablet 11 submits the encoded request at the redirect URL received in step 181. Then, in step 185, the communication platform/channel server 36 requests login details, e.g. username and password, e.g. in a new browser window. The user then enters these details and submits them to the communication platform/channel server 36 in step 189.

Once the identity provider is satisfied that the user is sufficiently authenticated, it processes the encoded request formulated by the Internet server 1, formulates a response, and sends the response back to the tablet 11 along with a redirect URL, which redirects back to the Internet server 1. The response includes an access token which the application can use to gain direct access to the identity provider's services on the user's behalf. In step 191, the browser on tablet 11 submits the received response at the redirect URL received in step 189. Step 145 of FIG. 10 is the same as in FIGS. 8 and 9. Steps similar to steps 117-123 of FIGS. 8 and 9 may be performed after step 145, but then via Facebook Messenger.

Figure 11:
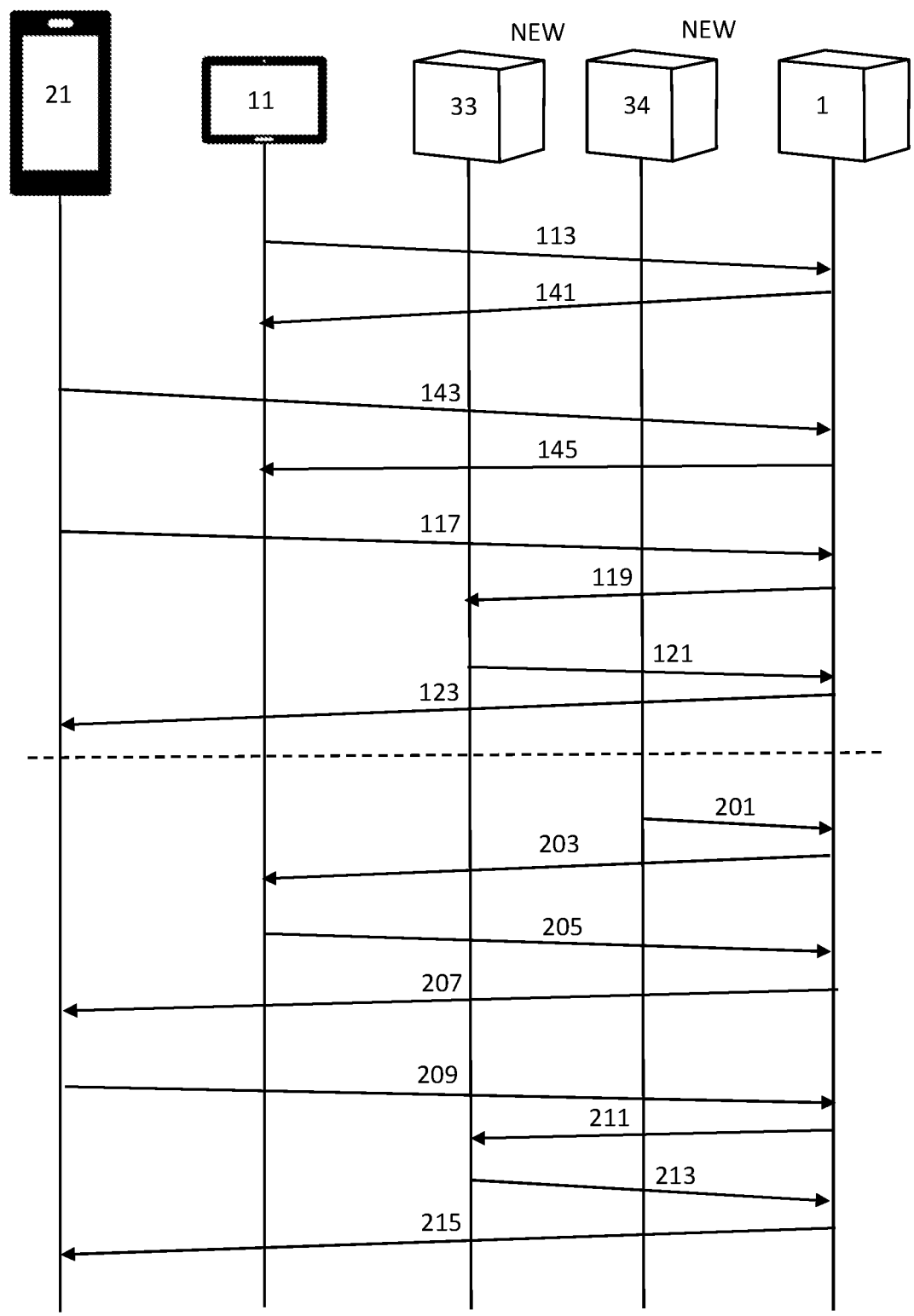
FIG. 11 shows a fifth example of a communication flow between different devices/systems of FIG. 1.

A fifth example of a communication flow between different devices/systems of FIG. 1 using multiple communication channels is shown in FIG. 11. This fifth example is an extension of the second example of FIG. 8. Step 101 to 113, steps 141 to 145, and steps 117 to 123 are performed as described in relation to FIGS. 7 and 8. After the mobile device 21 has been authenticated by the Internet server 1 and messages have been exchanged between the user and the live agent of brand A, the user visits another brand/website that he has not visited before: the website of brand B.

Some of the steps performed before step 201 are not shown in FIG. 11. First, the tablet 11 requests an HTML page with a live chat from web server 34. In response, the web server 34 then transmits an HTML page to the tablet 11. After decoding the HTML page, the browser identifies the live chat frame of the HTML page and requests the contents of this frame from the URL associated with this frame, which is located on Internet server 1. In response, the Internet server 1 (of the communications integrator) sends the contents of the requested frame to the tablet 11. These contents include the same widget sent in step 107 (not shown in FIG. 11).

In step 201, the live agent enters a message in a web application running on web server 34, which sends it to the Internet server 1. In step 203, the Internet server 1 then sends the message to the tablet 11 to be displayed in the frame. Assuming that a frame similar to the frame 55 of FIG. 3 has been sent, the user again selects to continue the chat by WhatsApp in step 205. However, the Internet server 1 now recognizes the user and has authenticated the validity of the user's phone number in step 145. An (encoded) user identifier may be stored as a cookie on the tablet 21, for example.

Even though a different web site on a different web server is visited, i.e. that of brand B instead of that of brand A, the same widget is obtained from the same communications integrator (and the same Internet server 1) and this widget therefore has access to the cookie storing the user identifier and is able to transmit it to the Internet server 1. The Internet server 1 is able to access the data it has stored relating to this user identifier.

It is therefore not necessary to authenticate the WhatsApp communication channel again and the switch to WhatsApp is confirmed in step 207. After the user receives the confirmation on his mobile phone 21 via WhatsApp, the user opens the WhatsApp app and sends a WhatsApp message in step 209. In step 211, this message is forwarded to the web application running on web server 34 and shown in a browser of a live agent that is accessing this web application. In step 213, the live agent enters a message in the web application, which sends it to the Internet server 1. The Internet server 1 then sends the message to the mobile phone 21 of the user via WhatsApp in step 215.

Figure 12:
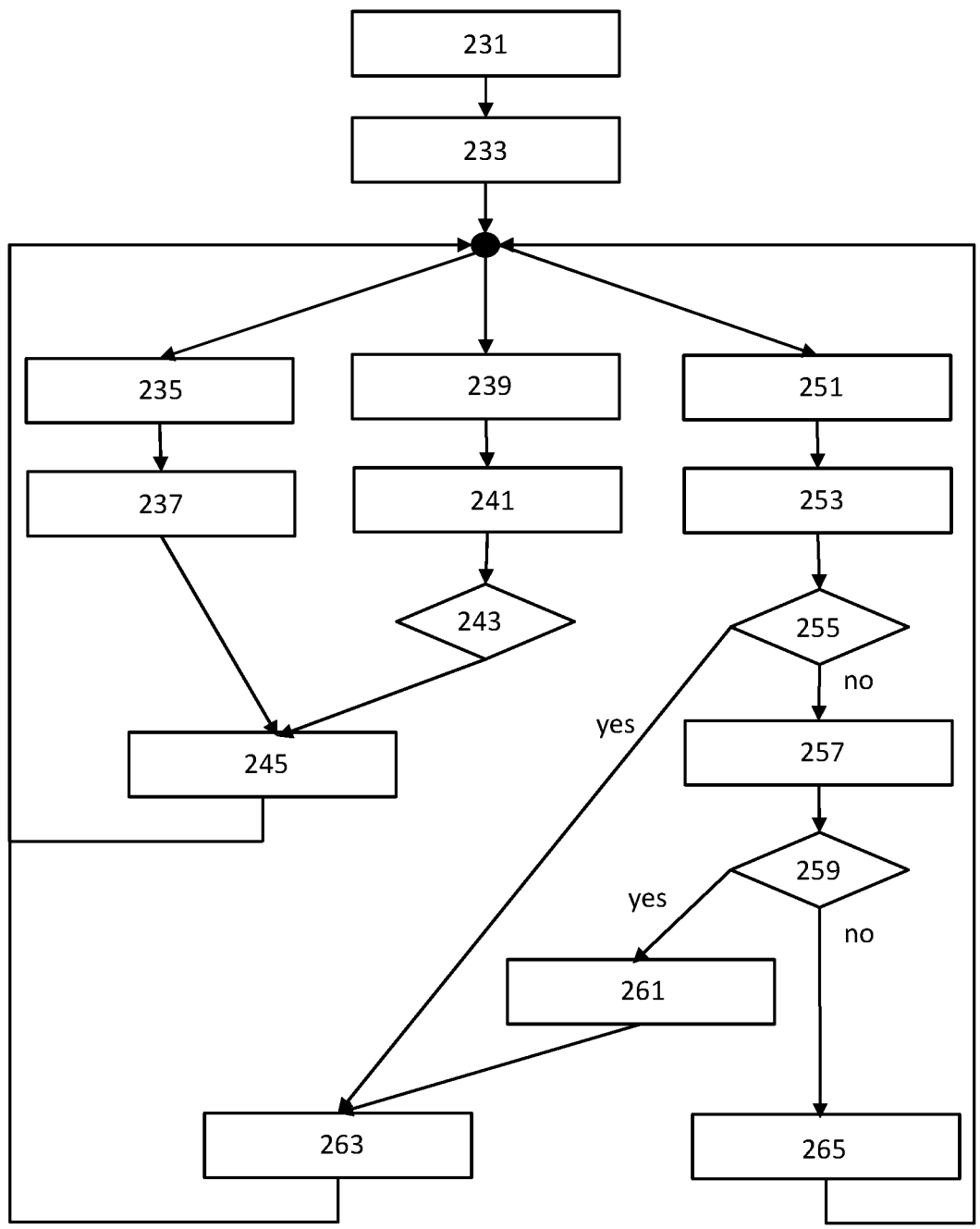
FIG. 12 is a flow diagram of an embodiment of the method of providing a live chat function by a communication integrator system.

An embodiment of the method of providing a live chat function by a communication integrator system is shown in FIG. 12. A step 231 comprises receiving a request from a client device to provide web content for a frame in a web document. The web document is provided to the client device by a further system.

A step 233 comprises transmitting the requested web content to the client device. The requested web content comprises an application for providing the live chat function. The application communicates with the communication integrator system when the application is executed by the client device. Step 235, step 239 or step 251 is performed after step 233.

Step 235 comprises exchanging a message between the client device and the further system or another system via the application, from live agent to user or from user to live agent. This message is associated with a first user identifier. The term "live agent" is used to distinguish a real person from a bot. However, bots may also be able to exchange messages with the user. A step 237 comprises determining a date and time of receipt or transmission of the message received in step 235. A step 245 is performed after step 237. Step 245 comprises adding the message received in step 237 to a uniform view, which is displayed on the client device via the application.

A step 239 comprises exchanging a message between the client device or a further client device and the further system or the other system via a further communication channel, from live agent to user or from user to live agent. This message is associated with a second user identifier. A step 241 comprises determining a date and time of receipt or transmission of the message received in step 239. A step 243 comprises determining whether the second user identifier corresponds to the same user as the first user identifier. If so, then step 245 is performed.

Step 245, when performed after step 243, comprises adding the message received in step 241 to the uniform view. The messages in the uniform view are ordered in chronological order based on the dates and times of receipt or transmission, as determined in steps 237 and 241. If the second user identifier does not correspond to the same user as the first user identifier, the message received in step 239 is not included in the uniform view. Step 235, step 239 or step 251 is performed (again) after step 245 has been completed.

Step 251 comprises receiving, via the application, from the client device, a request to switch to the further communication channel. Next, a step 253 comprises receiving the second user identifier from the client device via the application. In an alternative embodiment, the second user identifier is obtained from storage means, e.g. of the system or of the further system, and relates to the same person as the first user identifier.

Step 255 comprises determining whether the second user identifier has been authenticated for any company or organization. If so, a step 263 is performed next. If not, a step 257 is performed next. Step 257 comprises attempting to authenticate the second user identifier over the further communication channel or with a communication platform/channel server corresponding to the further communication channel A step 259 comprises determining whether the authentication attempt of step 257 was successful and performing a step 261 if so.

Step 261 comprises storing the second user identifier as an authenticated user identifier associated with the first user identifier. Next, step 263 comprises confirming to the user, via the application, that the switch to the further communication channel has been performed. If it is determined in step 259 that the authentication attempt of step 257 was not successful, a step 265 is performed. Step 265 comprises indicating to the user, via the application, that the authentication has failed. Step 235, step 239 or step 251 is performed (again) after step 263 or step 265 has been completed.

Figure 13:
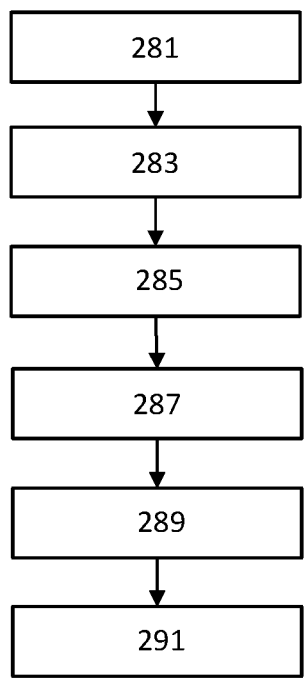
FIG. 13 is a flow diagram of an embodiment of the method of providing a live chat function at a client device.

An embodiment of the method of providing a live chat function at a client device is shown in FIG. 13. A step 281 comprises receiving a web document from a web server. The web document comprises a frame. A step 283 comprises transmitting a request to provide web content for the frame to a communication integrator system.

A step 285 comprises receiving the requested web content from the communication integrator system. The requested web content comprises an application for providing the live chat function. The application communicates with the communication integrator system when the application is executed by the client device.

A step 287 comprises exchanging a first plurality of messages between the client device and the web server or another system via the application. The first plurality of messages is associated with a first user identifier.

A step 289 comprises receiving, via the application, from the communication integrator system, a uniform view of the first plurality of messages and a second plurality of messages. The second plurality of messages is exchanged between the client device or a further client device and the web server or the other system via a further communication channel. The second plurality of messages is associated with a second user identifier. The first user identifier and the second user identifier correspond to (belong to) a single user. The messages in the uniform view are ordered in chronological order based on dates and times of receipt or transmission of the first and second pluralities of messages. A step 293 comprises displaying the uniform view on a display.

Figure 14:
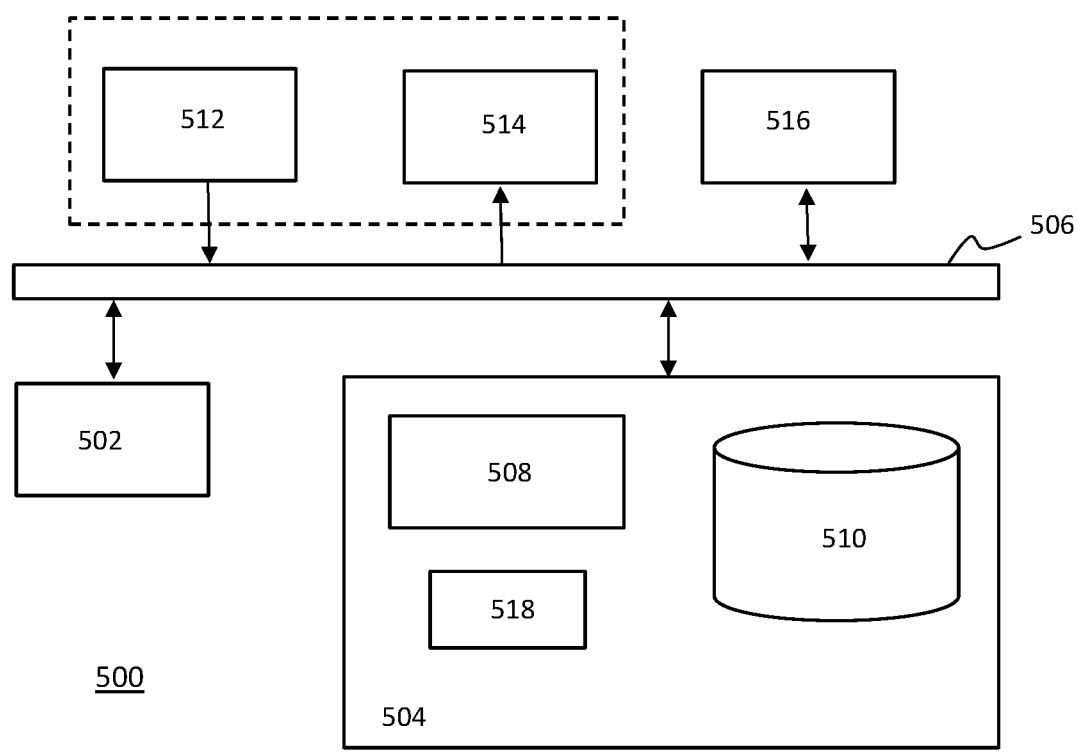
FIG. 14 is a block diagram of an exemplary data processing system for performing the method of the invention.

FIG. 14 depicts a block diagram illustrating an exemplary data processing system that may perform the methods and flows as described with reference to FIGS. 7 to 13.

As shown in FIG. 14, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the quantity of times program code must be retrieved from the bulk storage device 510 during execution. The processing system 500 may also be able to use memory elements of another processing system, e.g. if the processing system 500 is part of a cloud-computing platform.

Input/output (I/O) devices depicted as an input device 512 and an output device 514 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 14 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 14, the memory elements 504 may store an application 518. In various embodiments, the application 518 may be stored in the local memory 508, the one or more bulk storage devices 510, or separate from the local memory and the bulk storage devices. It should be appreciated that the data processing system 500 may further execute an operating system (not shown in FIG. 14) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

FIG. 14 shows the input device 512 and the output device 514 as being separate from the network adapter 516. However, additionally or alternatively, input may be received via the network adapter 516 and output be transmitted via the network adapter 516. For example, the data processing system 500 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

What is claimed is:

1. A system for providing a live chat function, said system comprising:
    at least one input interface;
    at least one output interface; and
    at least one processor configured to:
        receive, via said at least one input interface, a request from a client device to provide web content for a frame in a web document, said web document being provided to said client device by a web server,
        transmit, via said at least one output interface, said requested web content to said client device, said requested web content comprising an application for providing said live chat function, said application communicating with said system when said application is executed by said client device,
        exchange a first plurality of messages between said client device and said web server via said application, said first plurality of messages being associated with a first user identifier, said first plurality of messages including at least one agent message received at said system and forwarded from said system to said client device,
        determine a first plurality of dates and times of receipt or transmission of said first plurality of messages,
        said system presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSEN- GER, WHATSAPP server, SIGNAL, WECHAT server, LINE, TELEGRAM, short message service (SMS), said system determining that said system has previously received a second user identifier that is associated with the further communication channel and has authenticated the validity of the second user identifier, and in response, said system transmitting a confirming message to a further client device via the further communication channel, exchange a second plurality of messages between said further client device and said web server via the further communication channel, said second plurality of messages being associated with a second user identifier, including receiving at least a second agent message from said web server and forwarding said second agent message to said further client device via the further communication channel, determine a second plurality of dates and times of receipt or transmission of said second plurality of messages, determine whether said first user identifier and said second user identifier correspond to a single user, and display a uniform view of messages exchanged using the plurality of different communication channels via the live chat function, the uniform view comprising said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission, wherein said at least one processor is configured to receive said second user identifier from said client device via said application or obtain said second user identifier from a storage device and determine whether said second user identifier has been authenticated for any company or organization.

2. The system as claimed in claim 1, wherein said at least one processor is configured to display, in said uniform view, at least one of said dates and times of receipt or transmission for at least one of said messages in said uniform view.

3. The system as claimed in claim 1, wherein said at least one processor is configured to display, in said uniform view, an indication of a communication channel over which said messages in said uniform view were received for each of said messages.

4. The system as claimed in claim 2, wherein said at least one processor is configured to receive, via said application, from said client device, a request to switch to said further communication channel.

5. The system as claimed in claim 1, wherein said at least one processor is configured to, upon determining that said second user identifier has not been authenticated for any company or organization:

attempt to authenticate said second user identifier over said further communication channel or with a communication platform server corresponding to said further communication channel, and store said second user identifier as an authenticated user identifier associated with said first user identifier upon performing said authentication successfully.

6. A method of providing a live chat function by a communication integrator system, said method comprising:

receiving a request from a client device to provide web content for a frame in a web document, said web document being provided to said client device by a web server;

transmitting said requested web content to said client device, said requested web content comprising an application for providing said live chat function, said application communicating with said communication integrator system when said application is executed by said client device;

exchanging a first plurality of messages between said client device and said web server via said application, said first plurality of messages being associated with a first user identifier, said first plurality of messages including at least one agent message received at said system and forwarded from said system to said client device;

determining a first plurality of dates and times of receipt or transmission of said first plurality of messages;

system presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSENGER, WHATSAPP server, SIGNAL, WECHAT server, LINE, TELEGRAM, short message service (SMS);

system determining that said system has previously received a second user identifier that is associated with the further communication channel and has authenticated the validity of the second user identifier, and in response, said system transmitting a confirming message to a further client device via the further communication channel;

exchanging a second plurality of messages between said further client device and said web server via the further communication channel, said second plurality of messages being associated with a second user identifier, including receiving at least a second agent message from said web server and forwarding said second agent message to said further client device via the further communication channel;

determining a second plurality of dates and times of receipt or transmission of said second plurality of messages;

determining whether said first user identifier and said second user identifier correspond to a single user; and displaying a uniform view of messages exchanged using the plurality of different communication channels via the live chat function, the uniform view comprising said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission, wherein said method further comprises receiving said second user identifier from said client device via said application or obtaining said second user identifier from a storage device and further comprises determining whether said second user identifier has been authenticated for any company or organization.

7. The method as claimed in claim 6, and further comprising receiving, via said application, from said client device, a request to switch to said further communication channel.

8. The method as claimed in claim 7, and further comprising, upon determining that said second user identifier has not been authenticated for any company or organization:
attempting to authenticate said second user identifier over said further communication channel or with a communication platform server corresponding to said further communication channel, and
storing said second user identifier as an authenticated user identifier associated with said first user identifier upon performing said authentication successfully.

9. A non-transitory computer readable medium for storing instructions when executed on a computer system perform a method of providing a live chat function by a communication integrator system, said method comprising:
receiving a request from a client device to provide web content for a frame in a web document, said web document being provided to said client device by a web server;
transmitting said requested web content to said client device, said requested web content comprising an application for providing said live chat function, said application communicating with said communication integrator system when said application is executed by said client device;
exchanging a first plurality of messages between said client device and said web server via said application, said first plurality of messages being associated with a first user identifier, said first plurality of messages including at least one agent message received at said system and forwarded from said system to said client device;
determining a first plurality of dates and times of receipt or transmission of said first plurality of messages;
system presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSENGER, WHATSAPP server, SIGNAL, WECHAT server, LINE, TELEGRAM, short message service (SMS);
system determining that said system has previously received a second user identifier that is associated with the further communication channel and has authenticated the validity of the second user identifier, and in response, said system transmitting a confirming message to a further client device via the further communication channel;
exchanging a second plurality of messages between said further client device and said web server via the further communication channel, said second plurality of messages being associated with a second user identifier, including receiving at least a second agent message from said web server and forwarding said second agent message to said further client device via the further communication channel;
determining a second plurality of dates and times of receipt or transmission of said second plurality of messages;
determining whether said first user identifier and said second user identifier corresponds to a single user; and
displaying a uniform view of messages exchanged using the plurality of different communication channels via the live chat function, the uniform view comprising said first plurality of messages and said second plurality of messages on said client device via said application upon determining that said first user identifier and said second user identifier correspond to a single user, said messages in said uniform view being ordered in chronological order based on said first and second pluralities of dates and times of receipt or transmission,
wherein said method further comprises receiving said second user identifier from said client device via said application or obtaining said second user identifier from a storage device and further comprises determining whether said second user identifier has been authenticated for any company or organization.

10. The non-transitory computer readable medium as claimed in claim 9, wherein said method further comprises receiving, via said application, from said client device, a request to switch to said further communication channel.

11. The non-transitory computer readable medium as claimed in claim 9, wherein said method further comprises, upon determining that said second user identifier has not been authenticated for any company or organization:
attempting to authenticate said second user identifier over said further communication channel or with a communication platform server corresponding to said further communication channel, and
storing said second user identifier as an authenticated user identifier associated with said first user identifier upon performing said authentication successfully.

12. A system for providing a live chat function, said system comprising:
at least one input interface;
at least one output interface; and
at least one processor configured to:
receive, via said at least one input interface, a request from a client device to provide web content for a frame in a web document, said web document being provided to said client device by a web server,
transmit, via said at least one output interface, said requested web content to said client device, said requested web content comprising an application for providing said live chat function, said application communicating with said system when said application is executed by said client device,
exchange a first plurality of messages between said client device and said web server via said application, said first plurality of messages being associated with a first user identifier, said first plurality of messages including at least one agent message received at said system and forwarded from said system to said client device,
said system presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSEN- GER, WHATSAPP server, SIGNAL, WECHAT server, LINE, TELEGRAM, short message service (SMS),
said system determining that said system has previously received a second user identifier that is associated with the further communication channel and has authenticated the validity of the second user identifier, and in response, said system transmitting a confirming message to a further client device via the further communication channel,
exchange a second plurality of messages between said further client device and said web server via the further communication channel, said second plurality of messages being associated with a second user identifier, including receiving at least a second agent message from said web server and forwarding said second agent message to said further client device via the further communication channel,
determine whether said first user identifier and said second user identifier correspond to a single user,
display a uniform view of messages exchanged using the plurality of different communication channels via the live chat function,
wherein said at least one processor is configured to receive said second user identifier from said client device via said application or obtain said second user identifier from a storage device and determine whether said second user identifier has been authenticated for any company or organization.

13. The system as claimed in claim 12, wherein said at least one processor is configured to receive, via said application, from said client device, a request to switch to said further communication channel.

14. The system as claimed in claim 12, wherein said at least one processor is configured to, upon determining that said second user identifier has not been authenticated for any company or organization:
attempt to authenticate said second user identifier over said further communication channel or with a communication platform server corresponding to said further communication channel, and
store said second user identifier as an authenticated user identifier associated with said first user identifier upon performing said authentication successfully.

15. A method of providing a live chat function by a communication integrator system, said method comprising:
receiving a request from a client device to provide web content for a frame in a web document, said web document being provided to said client device by a web server;
transmitting said requested web content to said client device, said requested web content comprising an application for providing said live chat function, said application communicating with said communication integrator system when said application is executed by said client device;
exchanging a first plurality of messages between said client device and said web server via said application, said first plurality of messages being associated with a first user identifier, said first plurality of messages including at least one agent message received at said system and forwarded from said system to said client device;
presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSENGER, WHATSAPP server, SIGNAL, WECHAT server, LINE, TELEGRAM, short message service (SMS);
determining that said system has previously received a second user identifier that is associated with the further communication channel and has authenticated the validity of the second user identifier, and in response, said system transmitting a confirming message to a further client device via the further communication channel;
exchanging a second plurality of messages between said further client device and said web server via the further communication channel, said second plurality of messages being associated with a second user identifier, including receiving at least a second agent message from said web server and forwarding said second agent message to said further client device via the further communication channel; and
determining whether said first user identifier and said second user identifier correspond to a single user,
displaying a uniform view of messages exchanged using the plurality of different communication channels via the live chat function,
wherein said method further comprises receiving said second user identifier from said client device via said application or obtaining said second user identifier from a storage device and further comprises determining whether said second user identifier has been authenticated for any company or organization.

16. The method as claimed in claim 15, and further comprising receiving, via said application, from said client device, a request to switch to said further communication channel.

17. The method as claimed in claim 15, and further comprising, upon determining that said second user identifier has not been authenticated for any company or organization:
attempting to authenticate said second user identifier over said further communication channel or with a communication platform server corresponding to said further communication channel, and
storing said second user identifier as an authenticated user identifier associated with said first user identifier upon performing said authentication successfully.

18. A non-transitory computer readable medium for storing instructions when executed on a computer system perform a method of providing a live chat function by a communication integrator system, said method comprising:
receiving a request from a client device to provide web content for a frame in a web document, said web document being provided to said client device by a web server;
transmitting said requested web content to said client device, said requested web content comprising an application for providing said live chat function, said application communicating with said communication integrator system when said application is executed by said client device; —exchanging a first plurality of messages between said client device and said web server via said application, said first plurality of messages being associated with a first user identifier, said first plurality of messages including at least one agent message received at said system and forwarded from said system to said client device;

presenting, in the frame, a plurality of options to select a plurality of different communication channels and receive, via the application, a selection of a particular option among the plurality of options corresponding to a further communication channel among the plurality of different communication channels, the further communication channel being different than the live chat function, the plurality of different communication channels comprising two or more of e-mail, FACEBOOK MESSENGER, WHATSAPP server, SIGNAL, WECHAT server, LINE, TELEGRAM, short message service (SMS);

determining that said system has previously received a second user identifier that is associated with the further communication channel and has authenticated the validity of the second user identifier, and in response, said system transmitting a confirming message to a further client device via the further communication channel;

exchanging a second plurality of messages between said further client device and said web server via the further communication channel, said second plurality of messages being associated with a second user identifier, including receiving at least a second agent message from said web server and forwarding said second agent message to said further client device via the further communication channel;

displaying a uniform view of messages exchanged using the plurality of different communication channels via the live chat function;

wherein said method further comprises receiving said second user identifier from said client device via said application or obtaining said second user identifier from a storage device and further comprises determining whether said second user identifier has been authenticated for any company or organization.

19. The non-transitory computer readable medium as claimed in claim 18, wherein said method further comprises receiving, via said application, from said client device, a request to switch to said further communication channel.

20. The non-transitory computer readable medium as claimed in claim 18, wherein said method further comprises, upon determining that said second user identifier has not been authenticated for any company or organization:

attempting to authenticate said second user identifier over said further communication channel or with a communication platform server corresponding to said further communication channel, and storing said second user identifier as an authenticated user identifier associated with said first user identifier upon performing said authentication successfully.

* * * * *